(12) United States Patent
Wahlig (10) Patent No.: US 6,269,459 B1
(45) Date of Patent: Jul. 31, 2001

(54) ERROR REPORTING MECHANISM FOR AN AGP CHIPSET DRIVER USING A REGISTRY

(75) Inventor: Elsie D. Wahlig, Cedar Park, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/139,870

(22) Filed: Aug. 25, 1998

(51) Int. Cl.[7] ....................................................... G06F 11/00
(52) U.S. Cl. ................................................ 714/48; 711/114
(58) Field of Search ................................... 714/48, 49, 52, 714/54, 2, 25, 27, 32, 39, 47, 38, 15, 16, 42; 711/114, 156, 115

(56) References Cited

U.S. PATENT DOCUMENTS

| 5,339,432 | | 8/1994 | Crick ..................................... 395/700 |
| 5,450,579 | * | 9/1995 | Johnson ................................ 395/650 |
| 5,732,282 | * | 3/1998 | Provino et al. ....................... 395/830 |
| 5,758,154 | | 5/1998 | Qureshi ................................. 395/651 |
| 5,774,640 | * | 6/1998 | Kurio ................................ 395/182.02 |
| 5,809,329 | | 9/1998 | Lichtman et al. ................... 395/828 |
| 5,815,647 | * | 9/1998 | Buckland et al. ............. 395/182.01 |
| 5,914,727 | | 6/1999 | Horan et al. ......................... 345/503 |
| 5,914,730 | | 6/1999 | Santos et al. ........................ 345/521 |
| 5,933,158 | | 8/1999 | Santos et al. ........................ 345/516 |
| 5,936,640 | | 8/1999 | Horan et al. ......................... 345/501 |
| 5,953,516 | | 9/1999 | Bonola ................................. 395/500 |
| 5,990,914 | * | 11/1999 | Horan et al. ......................... 345/521 |
| 6,009,476 | | 12/1999 | Flory et al. .......................... 709/301 |
| 6,049,316 | | 4/2000 | Nolan et al. .............................. 345/1 |
| 6,067,541 | * | 5/2000 | Raju et al. ................................ 707/3 |
| 6,069,638 | | 5/2000 | Porterfield ............................ 345/516 |
| 6,105,150 | | 8/2000 | Noguchi et al. ....................... 714/44 |
| 6,119,248 | | 9/2000 | Merkin .................................. 714/52 |

OTHER PUBLICATIONS

Donald L. Dietmeyer; "Logic Design of Digital Systems" Third Edition; Allyn and Bacon, Inc. 1988, 1978, 1971; pp. 551–552.

Common Architecture, *Desktop PC/AT Systems*, Mar. 21, 1996, Verion .93, pp. 1–26.

Intel Corporation, *Accelerated Graphics Port Interface Specification*, Jul. 31, 1996, Revision 1.0, pp. ii–x and pp. 1–151.

Paul McFedries, *Windows95 Unleashed*, Copyright 1996, pp. 387–411.

* cited by examiner

Primary Examiner—Nadeem Iqbal
(74) Attorney, Agent, or Firm—Skjerven Morrill MacPherson LLP; Stephen A. Terrile (57) ABSTRACT

The invention relates to a method for reporting errors during the operation of an Accelerated Graphics Port (AGP) device driver operating on an AGP chipset. The method includes providing an operating system with a persistent data file, determining whether an error has occurred during the operation of the AGP chipset device driver, writing an error code to the persistent data file, and returning to operation of the AGP chipset device driver.

18 Claims, 11 Drawing Sheets

```
REGEDIT4

[MyComputer\HKEY_LOCAL_MACHINE\System\
CurrentControlSet\Services\VxD\PCI\GARTMiniports\61001022\
amdcustom]
"config"="tst1-2x16"
"tstatus"="0x0"
"qdepth"="16"
"dspeed"="2x"
"sbaddr"="on"
"flushmode"="on"
"ptcache"="on"
"mtcache"="on"
```

Figure 10A

```
REGEDIT4

[MyComputer\HKEY_LOCAL_MACHINE\System\
CurrentControlSet\Services\VxD\PCI\GARTMiniports\61001022\
amdcustom]
"config"=""
"tstatus"=""
"qdepth"=""
"dspeed"=""
"sbaddr"=""
"flushmode"="on"
"ptcache"=""
"mtcache"=""
```

Figure 10B

ERROR REPORTING MECHANISM FOR AN AGP CHIPSET DRIVER USING A REGISTRY

CROSS REFERENCE TO RELATED APPLICATIONS

This application relates to co-pending U.S. patent application Ser. No. 09/139,523, filed on even date herewith, entitled Configuration Method for an Accelerated Graphics Port Chipset Driver and naming Elsie D. Wahlig as inventor, the application being incorporated herein by reference in its entirety.

This application relates to co-pending U.S. patent application Ser. No. 09/139,877, filed on even date herewith, entitled Error Reporting Mechanism for an AGP Chipset Driver by Reporting Error Status to a Register and naming Elsie D. Wahlig as inventor, the application being incorporated herein by reference in its entirety.

This application relates to co-pending U.S. patent application Ser. No. 07/139,870, filed on even date herewith, entitled Error Reporting Mechanism for An AGP Chipset Driver using a Registry and naming Elsie D. Wahlig as inventor, the application being, incorporated herein by reference in its entirety.

This application relates to co-pending U.S. patent application Ser. No. 09/139,584, filed on even date herewith, entitled Method for Enabling and Configuring an AGP Chipset Cache Using a Registry and naming Elsie D. Wahlig as inventor, the application being incorporated herein by reference in its entirety.

This application relates to co-pending U.S. patent application Ser. No. 09/139,878, filed on even date herewith, entitled Method for Providing a Single AGP Chipset Driver with Different GART Formats and naming Elsie D. Wahlig as inventor, the application being incorporated herein by reference in its entirety.

BACKGROUND OF THE INVENTION

1. Field of the Invention

The present invention relates to device drivers, and more particularly, to device drivers for use with Accelerated Graphics Port chipsets.

2. Description of the Related Art

Personal computer systems in general and IBM compatible personal computer systems in particular have attained widespread use for providing computer power to many segments of today's modern society. A personal computer system can usually be defined as a desk top, floor standing, or portable microcomputer that includes a system unit having a system processor and associated volatile and non-volatile memory, a display device, a keyboard, one or more diskette drives and a fixed disk storage device. One of the distinguishing characteristics of these systems is the use of a system board to electrically connect these components together. These personal computer systems are information handling systems which are designed primarily to give independent computing power to a single user (or a relatively small group of users in the case of personal computers which serve as computer server systems) and are inexpensively priced for purchase by individuals or small businesses.

One aspect of the computer system that has received attention is the interface between the system unit and the display device. It is desirable that this interface be as fast and efficient as possible because this interface determines what a user sees when operating the computer system. To this end, a number of protocols and standards have been developed to increase the speed and efficiency of the interface between the system unit and the display device. One such standard is the Accelerated Graphics Port (AGP) interface standard.

The AGP interface standard provides a high performance, component level interconnect which is targeted at three-dimensional (3D) graphical display applications. The AGP interface standard is based on a set of performance extensions or enhancements to a PCI bus architecture. More specifically, the AGP interface standard provides for deeply pipelined memory read and write operations, which hides memory access latency, demultiplexing of address and data on a Peripheral Component Interconnect (PCI) bus to improve efficiency and timing for transfer rates that are faster than that of the PCI bus. These enhancements are realized through the use of sideband signals. The AGP interface is intended to provide a dedicated visual display device connection where all other input/output (I/O) devices remain on the PCI bus. The AGP interface standard is set forth and defined by the *Accelerated Graphics Port Interface Specification,* which is provided by Intel Corporation. The implementation of the AGP interface standard by a particular chipset includes an AGP chipset device driver which is called when access to the interface is desired.

Some operating systems are known to provide a central repository for all program setting and options within an operating system. For example, with the WINDOWS 95 and WINDOWS 98 operating systems available from Microsoft Corp., a file referred to as the Registry is provided to hold all this information. The Registry is a database that contains entries for application settings as well as WINDOWS 95 settings and preferences. Many of these values are generated by selecting customization options in, for example, the Control Panel of WINDOWS 95. Information that is stored in the Registry includes hardware settings, object properties, operating system settings and application options. For the purposes of this invention, WINDOWS 95 and WINDOWS 98 are substantially the same.

The Registry includes at least two portions, a user portion and a system portion. The user portion, which is stored in a file named user.dat, stores user specific information such as Control Panel settings, Desktop icons, Start menu folders and shortcuts, Explorer configuration, settings for Windows 95 accessories and Network connections and passwords. The system portion, which is stored in a file named system.dat, stores system specific information such as various hardware classes that Window 95 recognizes, devices attached to the computer for each hardware class, Resources (e.g., IRQs, I/O ports, and DMA channels) that are used by each device, Plug and Play information, protected-mode device drivers that are loaded at startup, internal Windows 95 settings and settings for specific 32-bit applications.

SUMMARY OF THE INVENTION

It has been discovered that it is beneficial to persistently store error states in a persistent data file such as a registry when operating a device driver of a graphics chipset.

More specifically, in one aspect, the invention relates to a method for reporting errors during the operation of a device driver operating on a graphics chipset. The method includes providing an operating system with a persistent data file, determining whether an error has occurred during the operation of the device driver, writing an error code to the persistent data file, and returning to operation of the device driver.

In another aspect, the invention relates to a method for reporting errors during the operation of an Accelerated Graphics Port (AGP) device driver operating on an AGP chipset. The method includes providing an operating system with a persistent data file, determining whether an error has occurred during the operation of the AGP chipset device driver, writing an error code to the persistent data file, and returning to operation of the AGP chipset device driver.

In preferred embodiments, the persistent data file is a registry file. Also, in preferred embodiments, the error code is one of a plurality of error codes stored in the persistent data file. Also, in preferred embodiments, the plurality of error codes are stored within a test status data field where the test status data field stores the four most recent error codes and the most recent error code writes over the least recent error. Also, in preferred embodiments, the test status data field is 32-bits wide and each error code includes an 8-bit byte.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

The following sets forth a detailed description of the best contemplated mode for carrying out the invention. The description is intended to be illustrative and should not be taken to be limiting.

Figure 1:
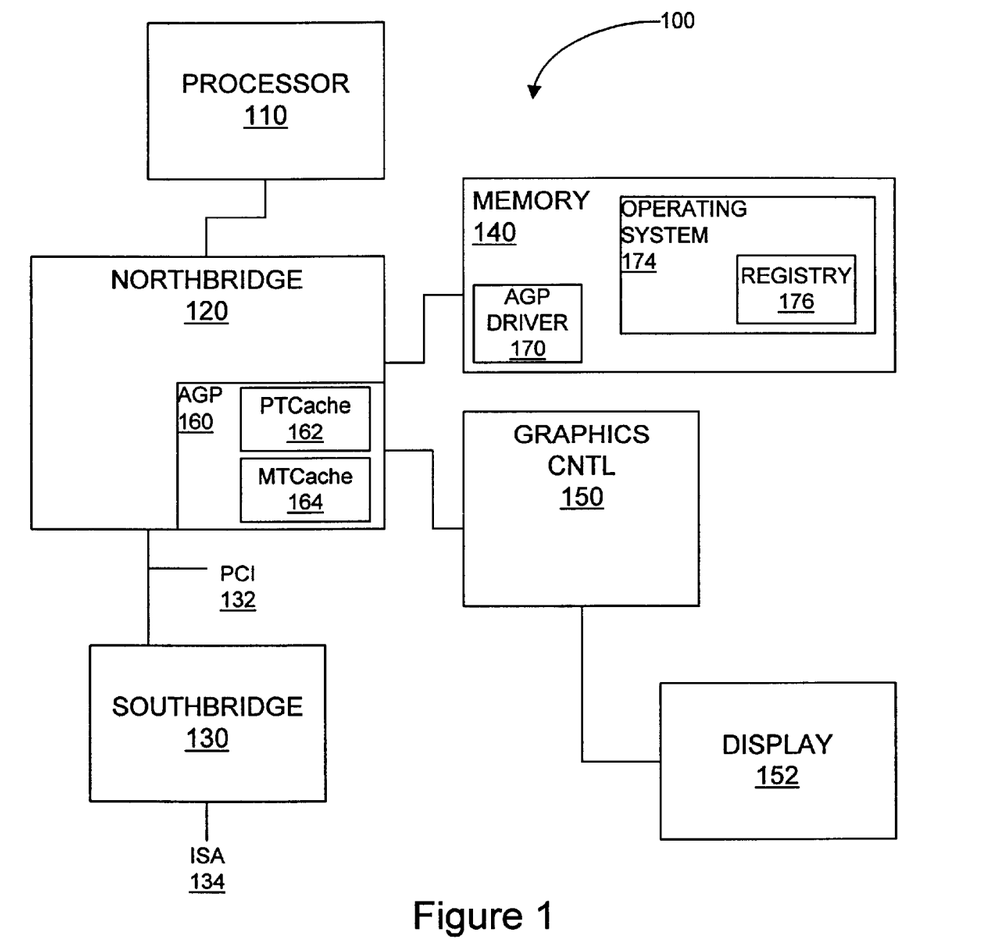
FIG. 1 shows a schematic block diagram of a computer system which includes an AGP interface.

Referring to FIG. 1, computer system 100 includes processor 110 which is coupled to a system control circuit 120, commonly referred to as a north bridge circuit, via host bus 122. System control circuit 120 is coupled to a super I/O circuit 130, which is commonly referred to as a south bridge circuit, via PCI bus 132. Super I/O control circuit 130 is in turn coupled to industry standard architecture (ISA) bus 134. Also coupled to the system control circuit 120 is a memory 140 and a graphics controller 150. Graphics controller 150 is in turn coupled to a display device 152.

System control circuit 120 includes logic for interfacing between processor 110 and PCI bus 132. System control circuit 120 also includes AGP circuit 160 which couples graphics controller 150 with system control circuit 120. System control circuit 120 may be implemented as multiple integrated circuit (IC) chips or as a single IC chip. Examples of other functions that may be included within the system control circuit 120 include the processor interface, system logic such as Gate A20, CPUReset, Port 92 and coprocessor support, L2 cache control, interrupt control, interval timer, distributed DMA I/O steering logic, scratch pad 612 registers not used by distributed DMA, DRAM data path and control, PCI arbiter function; PCI clock source and control; processor clock source and control; processor and clock power management; central resource for CLKRUN#, Port 61 speaker tone; PCI interrupt inputs and SerIRQ PCI interface extensions. System control circuit 120 is also referred to as the core logic. When the core logic is contained within one or a small number of integrated circuits, the core logic is referred to as integrated core logic. AGP circuit 160 includes master table cache 162 and page table cache 164.

Super I/O circuit 130 includes logic for interfacing between PCI bus 132 and ISA bus 134. Examples of other functions that may be included within the super I/O circuit 130 include a boot read only memory (ROM), self contained power management, a real time clock, page mode registers, an ISA bus, a keyboard controller, control for audio, a PCI docking bridge, a secondary PCI bridge as well as other functions.

Memory 140 may include both volatile and non-volatile memory. Computer system 100 includes various software systems within memory 140. One such system is the AGP chipset driver 170. AGP chipset driver 170 is stored in non-volatile memory when the computer system is powered off and may be loaded into volatile memory, such as random access memory (RAM) during the operation of computer system 100. An example of another software system that computer system 100 includes is the operating system 174 for computer system 100. In the preferred embodiment, operating system 174 includes a persistent data file such as registry 176.

Figure 2:
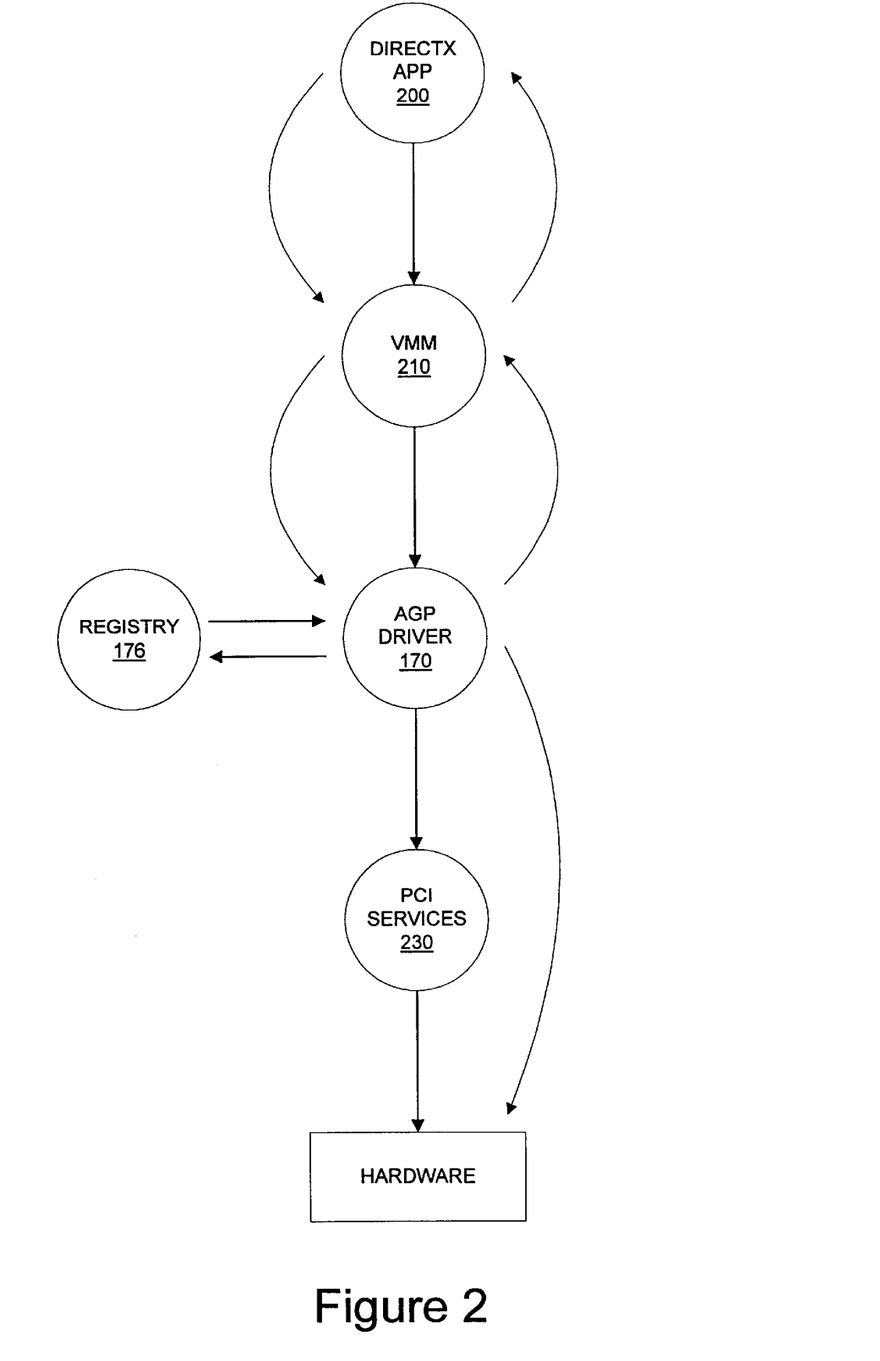
FIG. 2 shows a block diagram of the interaction of various software components of the computer system of FIG. 1 including an AGP chipset driver.

Referring to FIG. 2, AGP chipset driver 170 operates in conjunction with the operating system for computer system 100. More specifically, when a DirectX component 200 is called, the DirectX component 200 in turn calls a virtual memory manager (VMM) 210. The virtual memory manager 120 then calls AGP chipset driver 170. The AGP chipset driver interacts with the Registry 176 of the operating system the PCI services routine 230 of the operating system as well as directly with the hardware of computer system 100 (e.g., Port80 of processor 110.

DirectX is a family of multimedia components that are designed to provide controlled access to system hardware components that most affect multimedia performance. DirectX includes a plurality of components including a DirectDraw component a Direct3D component, a DirectSound component, a DirectInput component and a DirectPlay component. The DirectX component that calls the AGP chipset driver 170 is the DirectDraw component. Other DirectX components that interact with the display device may also call the AGP chipset driver 170.

The DirectDraw component is an application program interface (API) that allows applications to control display hardware directly. DirectDraw provides a full range of two-dimensional devices including bitmap composition and animation. The DirectDraw component includes two functions, direct manipulation of video display memory and direct manipulation of display hardware management services.

Virtual memory manager 210 provides a demand paged virtual memory model which is included within the operating system of computer system 100. The virtual memory manager 210 uses a dynamic swap file in which a paging file grows as applications and data are accessed and used and shrinks as programs are shut down or documents are closed.

AGP chipset driver 170 implements an interface according to the AGP interface specification for a particular chipset. AGP chipset driver also includes further enhancements and improvements over an interface which corresponds to the AGP interface specification. These enhancements and improvements include special configurable options which allow data fields that are specified within the AGP interface specification to be configurable, providing error control within the AGP chipset driver and enhanced AGP cache control.

More specifically, two of the data fields that are defined by the AGP interface specification are the queue depth data field and the data speed data field. The queue depth data field initialization parameter for the AGP interface is reserved for a target and is used to configure a master device. AGP chipset driver 170 uses the queue depth data field to force a configuration depending on the desired test size for a target, thereby allowing the target to be tested for a variety of queue depths. The data speed data field is set by the operating system to a common speed accommodated by both the master and target. AGP chipset driver 170 allows the data speed to be set to a desired speed between the master and the target thereby enabling testing of the master slave interface in a number of different conditions.

Figure 3:
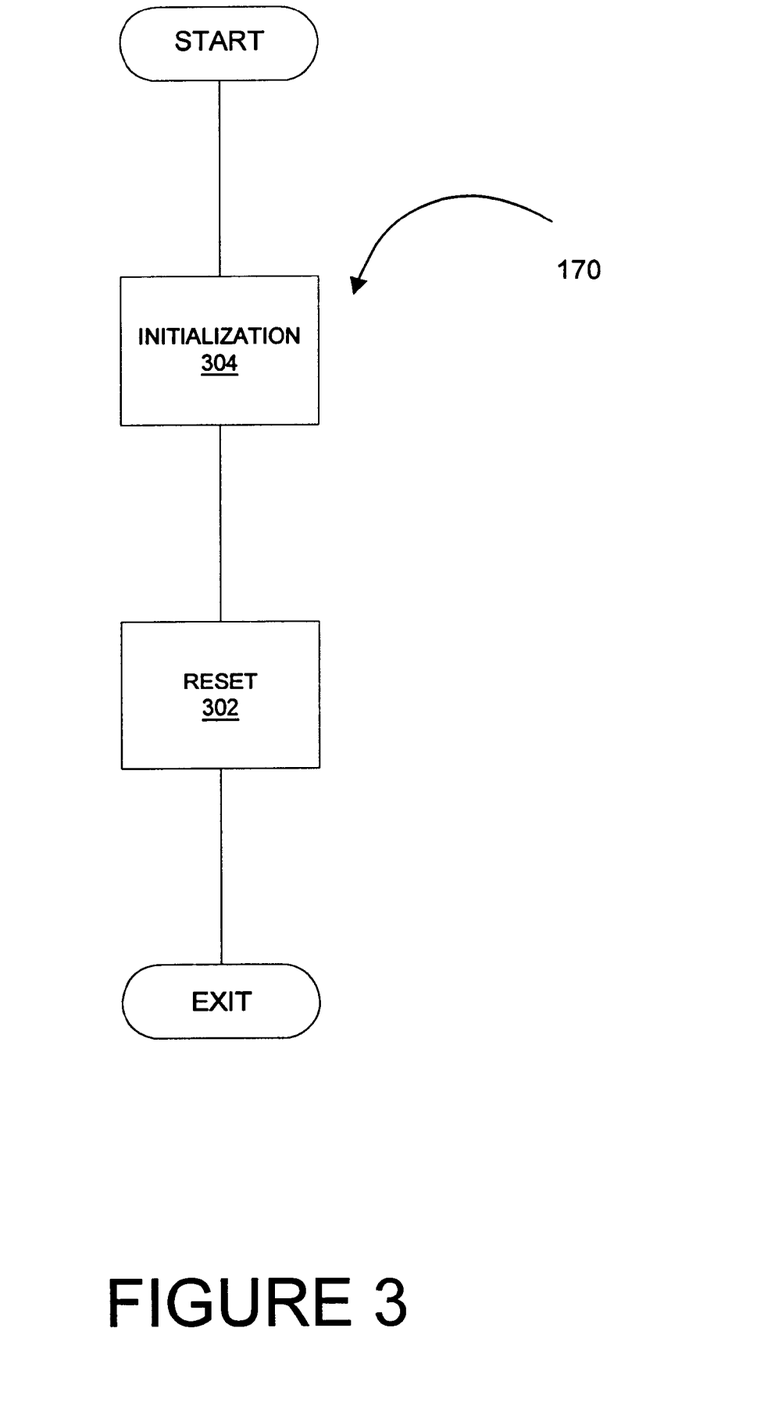
FIG. 3 shows a flow chart of an AGP chipset driver in accordance with the present invention.

Referring, to FIG. 3, AGP chipset driver 170 includes a plurality of modules that are executed when the AGP chipset driver is initialized. More specifically, when the AGP chipset driver 170 is accessed by the virtual memory manager 210, the AGP chipset driver 170 first executes an initialization module 304. After the initialization module 304 completes execution, the virtual memory manager 210 then executes a reset module 302. After the reset module 302 completes execution, the execution of the AGP chipset driver 170 completes and control returns to virtual memory manager 210. Initialization module 304 configures the AGP chipset based upon values that are stored within the registry and sets global variables based upon the values that are stored within the registry during the operation of chipset driver 170. Reset module 302 determines whether the access to AGP chipset driver 170 is the first such access after reset and if so appropriately configures the Graphics Address Remap Table (GART) based upon the translation mode of operation. If the access to AGP chipset driver 170 is not the first such access, then Reset module 302 initializes all tables based upon the previous configuration. Additionally, Reset module 302 configures and selectively enables the chipset cache using registry settings for a master table cache (MTCache) and a Page Table Cache (PTCache).

Figure 4:
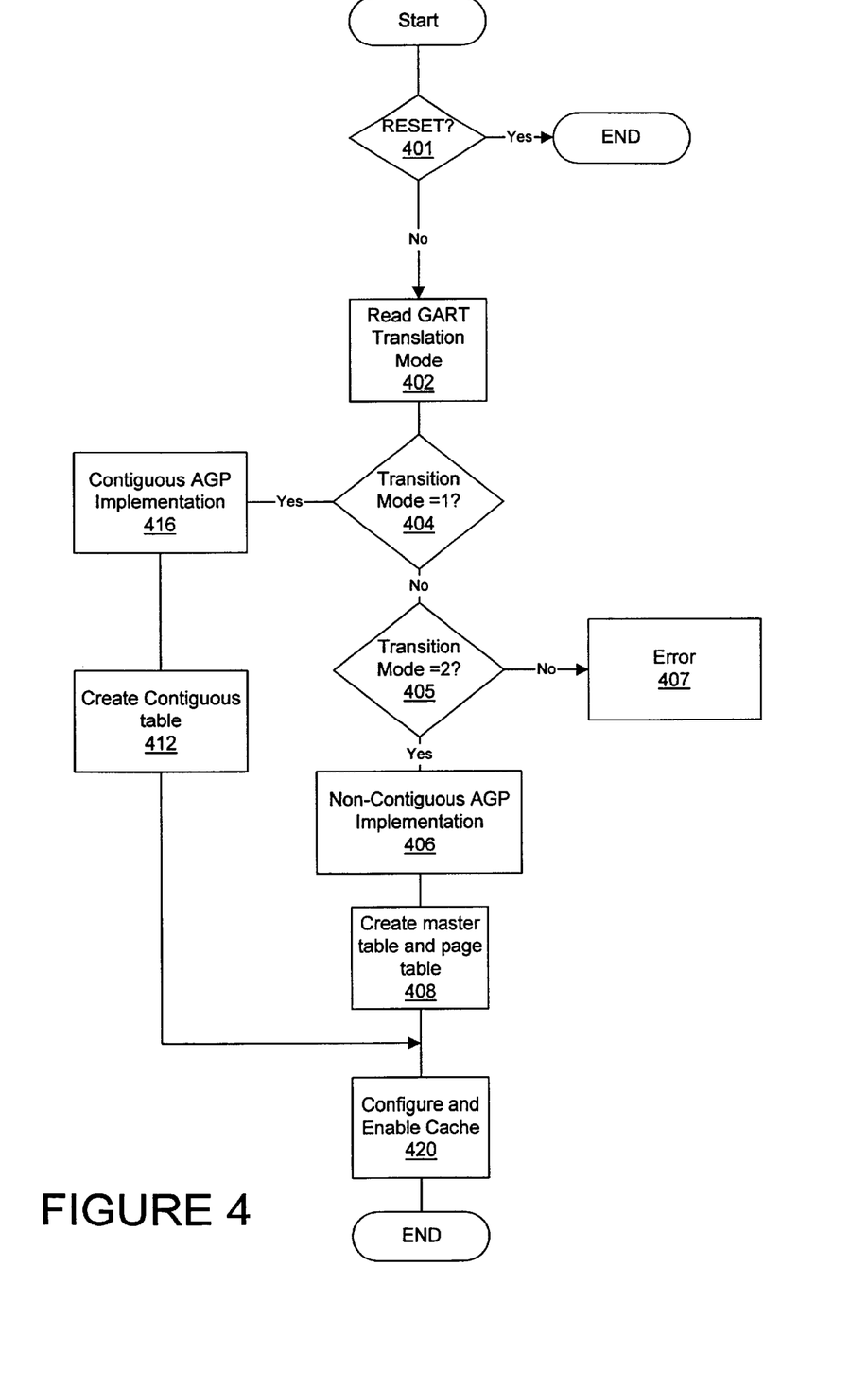
FIG. 4 shows a flow chart of a reset function of the AGP chipset driver of FIG. 3.

Referring to FIG. 4, when reset module 302 is accessed by AGP chipset driver 170, reset module 302 first determines whether the access to AGP chipset driver 170 is the first access after computer system 100 has been reset during reset step 401. If this access is not the first access then AGP chipset driver 170 determines that the GART-table has already been configured. Accordingly, AGP chipset driver 170 reinitializes all tables and returns to AGP chipset driver 170. If this access is the first access then AGP chipset driver 170 determines that the reset module 302 should allocate memory space and configure that space according to the appropriate GART translation mode. Accordingly, AGP chipset driver 170 transfers control to access step 402.

During access step 402 AGP chipset driver 170 accesses the GART translation mode information. More specifically, AGP chipset driver 170 accesses the GART translation mode information by accessing the GARTTranslationMode field in the registry space for AGP chipset driver 170. Next, during determination step 404, AGP chipset driver 170 determines whether the translation mode information is equal to one. If the GART translation mode information does not equal one, then AGP chipset driver 170 determines whether the GART translation mode information is equal to two. If the GART translation mode does not equal two, then AGP chipset driver 170 determines that an error has occurred and calls an error routine 407. The translation mode information refer to how many levels of indirection are used to translate to a real memory location. E.g., when the translation mode information equals 1, then one level of indirection is used to translate to a real memory location. When the translation mode information equals two, then two levels of indirection are used to translate to a real memory location.

If AGP chipset driver 170 determines that the GART translation mode information is equal to two, then AGP chipset driver 170 determines that a non-contiguous AGP table is to be configured at non-contiguous AGP step 406. A non-contiguous AGP table implementation includes a master table and a page table. Accordingly, during create master table and page table step 408 a master table and a page table is created. The master table contains 32-bit physical addresses in which the top 20 bits point to a physical address location of a page table in the system memory.

If the translation mode information equals one, then AGP chipset driver 170 determines that a contiguous AGP table is to be configured at contiguous AGP step 416. A contiguous AGP implementation includes a master table that contains a contiguous block of memory. Accordingly, during create master table step 412, a master table is created.

After the appropriate tables are created, then chipset driver 170 executes configure cache step 420. After the GART tables are created, then the tables are initialized by setting all of the entries in the values to a "free value". This value is passed into the chipset driver 170 by the operating system 174. During configure cache step 420, chipset driver 170 enables or disables the caches to be used by the AGP function 160 in the northbridge 120. The chipset driver 170 determines whether to enable or disable the cache depending on the value stored in the registry field MTCache and PTCache.

Figure 5A:
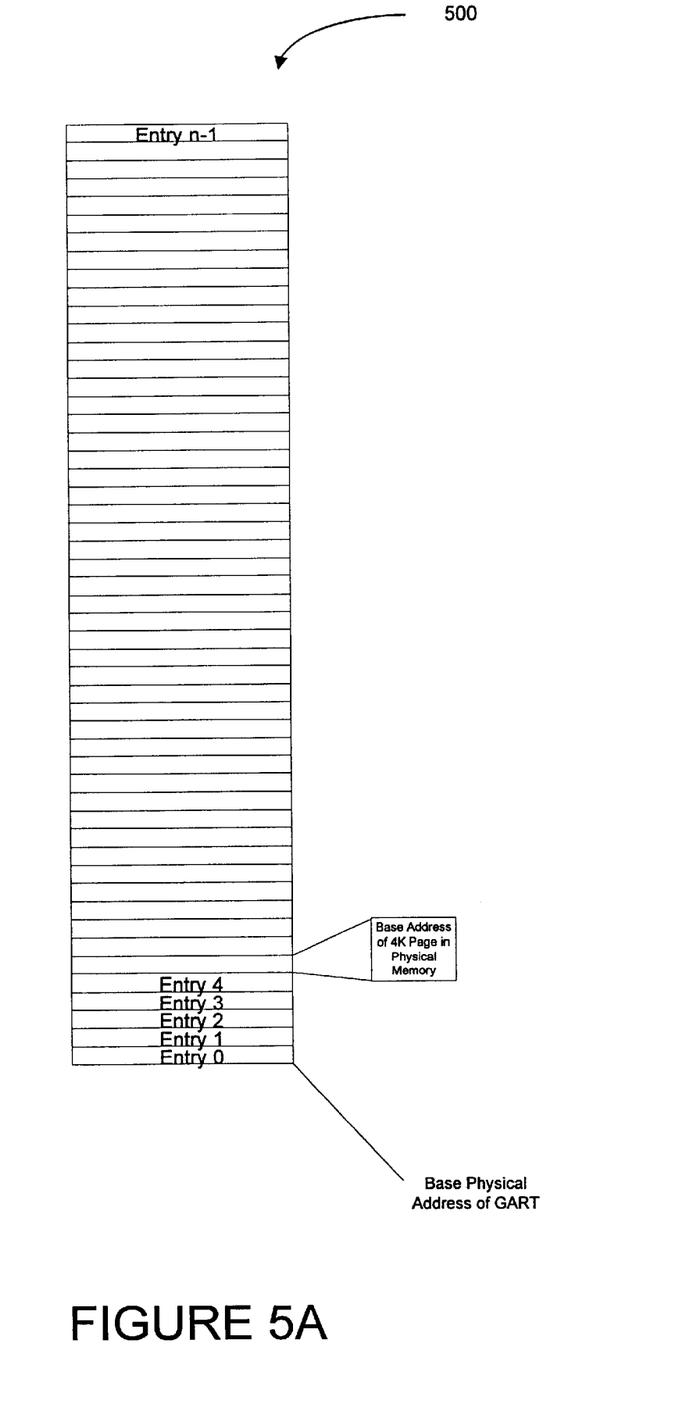
FIGS. 5A and 5B show diagrammatic block diagrams of translation modes that may be configured by the reset function of FIG. 4.
Figure 5B:
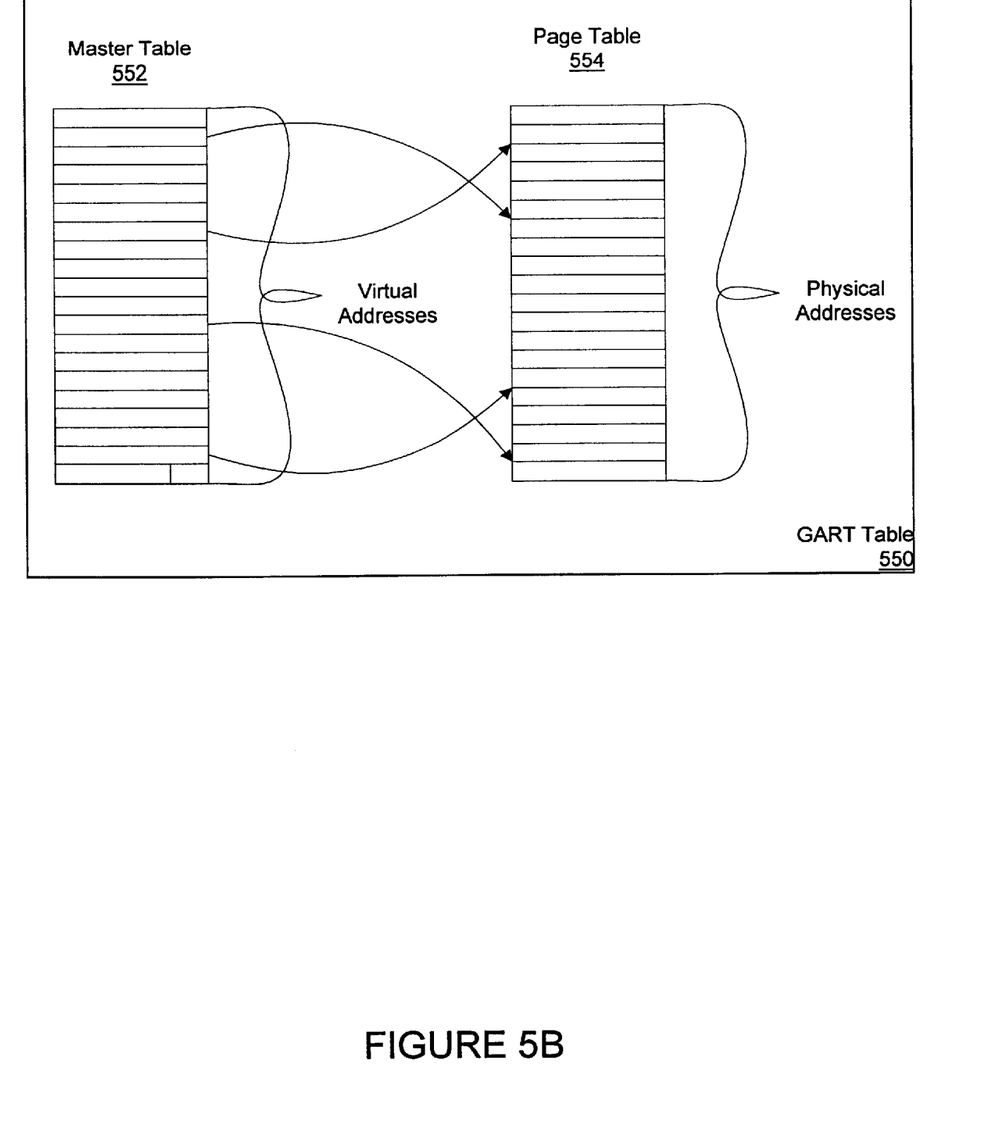

Referring to FIGS. 5A and 5B, the various GART table configurations are shown. More specifically, FIG. 5A shows a contiguous AGP table implementation that is configured when the GART translation mode information so indicates. In the contiguous AGP table implementation, the GART 500 includes a contiguous block of memory in which each entry includes a base physical address, e.g., corresponding to a 4 Kbyte block of memory. Each entry contains the physical address of a 4 Kbyte page of system memory.

FIG. 5B shows a non-contiguous AGP table implementation that is configured when the GART translation mode information so indicates. In the non-contiguous AGP table implementation, the GART 550 includes a master table 552 and a page table 554 which each include a plurality of entries of 32-bit physical addresses. For each entry fo the master table 552, the 20 more significant bits of the 32-bit physical address points to a physical address in memory which may be non-contiguous. I.e., each entry does not necessarily correspond to physical addresses in the memory which are adjacent to one another.

Figure 6:
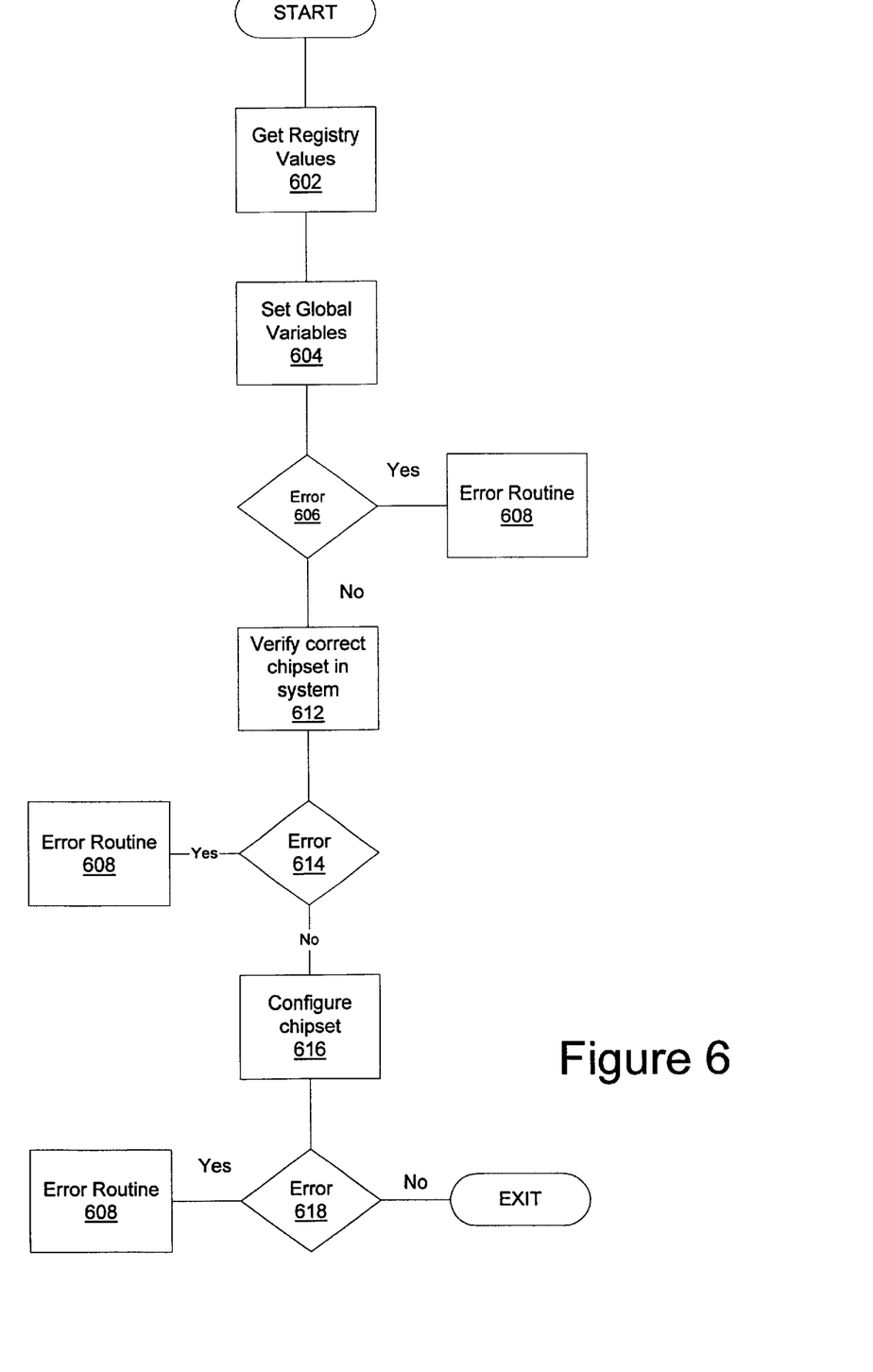
FIG. 6 shows a flow chart of a configure function of the AGP chipset driver of FIG. 3.

Referring to FIG. 6, when initialization module 304 is executed, AGP chipset driver 170 first obtains test configuration parameter information from the registry 176 and more specifically from a system portion, e.g., from a system. dat, portion of the registry 176 during registry access step 602. These variables are then saved as global variables during save step 604.

The registry access step 604 obtains user specified information from the registry 176. When accessing the registry access module, configure module 304 first assigns value and unicode string space addresses to the structure that is passed into the registry value gathering function. For example, one implementation for assigning value and unicode string space addresses is set forth by the following code written in C programming language.

```
Registry_Values.pDspeed_Value        =&Dspeed_Value;
Registry_Values.pQdepth_Value        =&Qdepth_Value;
Registry_Values.pGARTTranslationMode =&GARTTranslationMode;
Registry_Values.pMTCache             =&MTCache;
Registry_Values.pPTCache             =&PTCache;
```

After the registry access step 604 obtains the requested information, then this information is checked during error step 606 to determine whether the information conforms to required parameters.

If the information does not conform to required parameters, then AGP chipset driver 170 accesses error module 608. Error module 608 reports the error status from the chipset driver to the registry 176 and optionally to a register of processor 110. After error module 608 reports the error status, AGP chipset driver 170 returns control to executing configure module 304. If the size of the registry table is not correct, then an error status is reported to a register from the chipset driver by calling out to OutPostCode(OxA2). In the prior art, drivers usually provide error information to a calling function. By reporting error and status information to a register, the current state of the AGP chipset driver 170 can be easily viewed and diagnosed. By reporting error and status information to the registry, a history of a number of past error codes, e.g., the last four error codes, are available after the chipset driver runs and possibly terminates.

After the values from the registry 176 are set during step 604, AGP chipset driver 170 validates that an acceptable chipset is in the system 100 during verify step 612. More specifically, the AGP function in the northbridge 120 is checked to determine whether the AGP is valid in the system 100. If the AGP is valid in the system, the system basic input/output system (BIOS) allocated the virtual address space for the AGP aperture. This is verified by the AGP chipset driver 170 verifying that a bit is set in the northbridge 120. If the AGP is not valid in the system 100, then error module 608 is accessed which reports the error status of chipset driver 170 to registry 176 and to a register in processor 110. Unsuccessful status is returned to the system 100 and the chipset driver 170 is unloaded. One implementation for validating that the AGP is valid in the system is set forth in the following C Programming language.

```
if (!(Temp_Value & VERIFY_AGP_BIT_
   MASK))
   {
         Set_Status_Subkey(0xB0);
         return STATUS_UNSUCCESSFUL;
   }
Where,
   Temp_Value=PCIReadDirectConfig(Target_Addr +
AMD_APERTURE_SIZE_OFFSET);
and,
VERIFY_AGP_BIT_MASK holds a value
of 0x00000001.
```

If the chipset is verified to be correct, then during configure chipset step 616 AGP chipset driver 170 configures the chipset by setting the various AGP chipset registers according to the configuration information gathered during get registry values step 602. The information from the registry 176 is compared to the hardware capabilities of the chipset 120 (AGP target) and the graphics controller 150 (AGP master). This information is retrieved from the PCT configuration space of each hardware device. For example, the data rate field (dspeed) in the registry 176 is used to program both the chipset and the graphics controller, during step 616. If it is not possible to program the data rate due to hardware limitations described by the PCI configuration space of each device, then step 618 determines that an error has occurred. If an error occurs of this nature, then the chipset driver 170 returns unsuccessfully and is unloaded by the system. One implementation for accessing the error module is the following code written in C programming language.

```
if (Configure_The_Chipset()!=STATUS_SUCCESS)
   {
         return STATUS_FAILURE;
   }
Where,
STATUS_SUCCESS = 0, and
STATUS_FAILURE =1.
```

Figure 7:
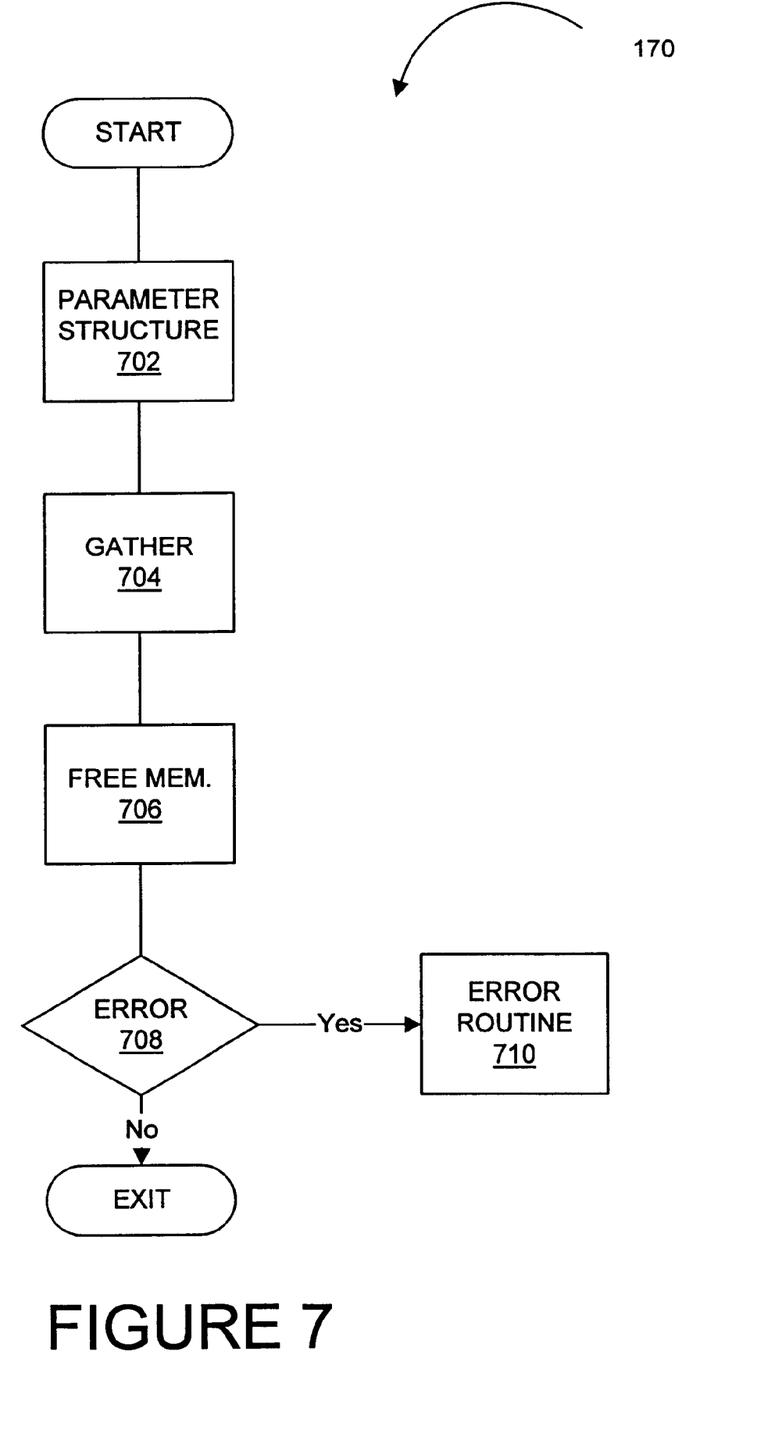
FIG. 7 shows a flow chart of a registry access function of the AGP chipset driver of FIG. 3.

Referring to FIG. 7, when registry access module 602 is accessed, AGP chipset driver 170 first defines the parameters structure for accessing the registry during parameters structure step 702. One implementation for defining the parameter structure is set forth by the following code written in C programming language.

```
Parameters[2].Flags          =RTL_QUERY_REGISTRY_DIRECT;
Parameters[2].Name           =L"qdepth";
Parameters[2].EntryContext   =Registry_Values.pQdepth_Value;
Parameters[2].DefaultType    =REG_DWORD
Parameters[2].DefaultData    =NULL
Parameters[2].DefaultLength  =0
Parameters[3].Flags          =RTL_QUERY_REGISTRY_DIRECT;
Parameters[3].Name           =L"dspeed";
Parameters[3].EntryContext   =Registry_Values.pdspeed_Value;
Parameters[3].DefaultType    =REG_DWORD
Parameters[3].DefaultData    =NULL
Parameters[3].DefaultLength  =0
Parameters[5].Flags          =RTL_QUERY_REGISTRY_DIRECT;
Parameters[5].Name           =L"GARTTranslationMode";
Parameters[5].EntryContext   =Registry_Values.GARTTranslation-
                              Mode;
Parameters[5].DefaultType    =REG_DWORD
```

```
Parameters[5].DefaultData      =NULL
Parameters[5].DefaultLength    =0
Parameters[6].Flags            =RTL_QUERY_REGISTRY_DIRECT;
Parameters[6].Name             =L"MTCache";
Parameters[6].EntryContext     =Registry_Values.pMTCache;
Parameters[6].DefaultType      =REG_DWORD
Parameters[6].DefaultData      =NULL
Parameters[6].DefaultLength    =0
Parameters[7].Flags            =RTL_QUERY_REGISTRY_DIRECT;
Parameters[7].Name             =L"PTCache";
Parameters[7].EntryContext     =Registry_Values.pPTCache;
Parameters[7].DefaultType      =REG_DWORD
Parameters[7].DefaultData      =NULL
Parameters[7].DefaultLength    =0
```

Once the parameter structure is defined, then the information is gathered from the registry at gather information step 704. One implementation of gather information step 604 is set forth in the following C programming language.

Status=RtlQueryRegistryValues(RTL_REGISTRY_SERVICES,RegPath_STri ng.Buffer, Parameters, NULL, NULL);

After the information is gathered, then any allocated memory is freed at free allocated memory step 706. After the memory is freed then the error status is checked at error step 708. If an error is detected then the error routine is called. If no error is detected then control returns to configure module 304.

Figure 8:
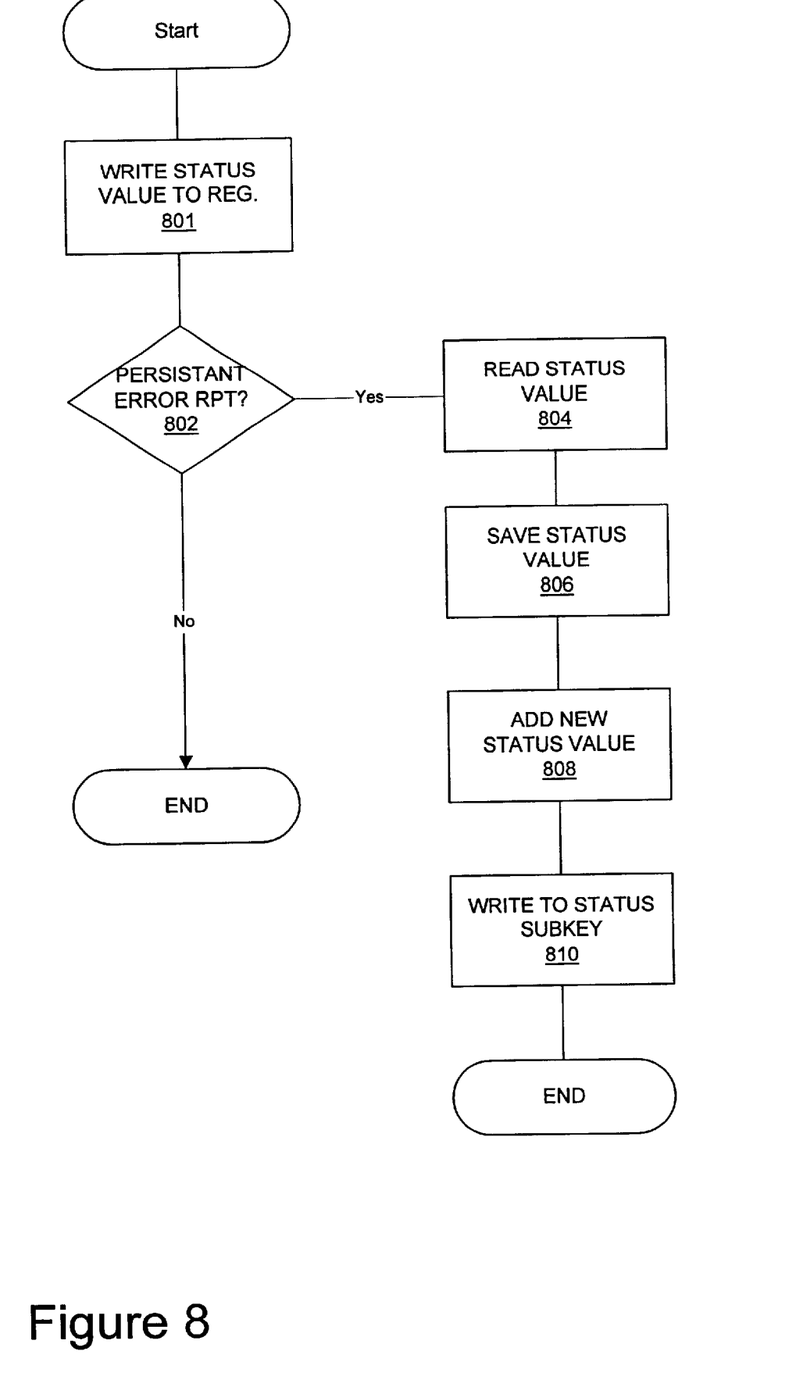
FIG. 8 shows a flow chart of an error function of the AGP chipset driver of FIG. 3.

Referring to FIG. 8, when an error routine is called from the various modules, the first step is reporting to error status to a register on processor 110 during write step 801. One implementation for the write status step 801 is set forth in the following C programming language.

OutPostCode (0xA2)
Where,
    the function OutPostCode is defined to write to processor 110 using the following inline assembly code.

```
#dfine OutPostCode(val)_asm{†
    _asm push eax
    _asm mov al, val†
    _asm out 0x80 al†
    _asm pop eax
}
```

If a persistent error report is desired, then the current status of the system saved in the registry is read from the registry 176. The current status is saved in the data field "tstatus" of the registry 176. The current status is a 32-bit status word. In this way, the last four status codes are stored in one location. After the current tstatus value is read, the last three codes are saved by moving over one byte. This action makes room in the 32-bit value for the new status value to be saved. Then the current 8-bit status is written to the last 8-bits of the 32-bit value. This new 32-bit value is written back to the tstatus field in the registry 176. One implementation for write to status subkey step 814 is set forth in the following C programming language.

RtlWriteRegistryValue( RTL_REGISTRY_SERVICES, RegPath_String.Buffer, pSubkey, REG_DWORd, &CurrentStatus, sizeof(unsigned long));
Where,
CurrentStatus is the new 32-bit value to be written to the registry.

Figure 9:
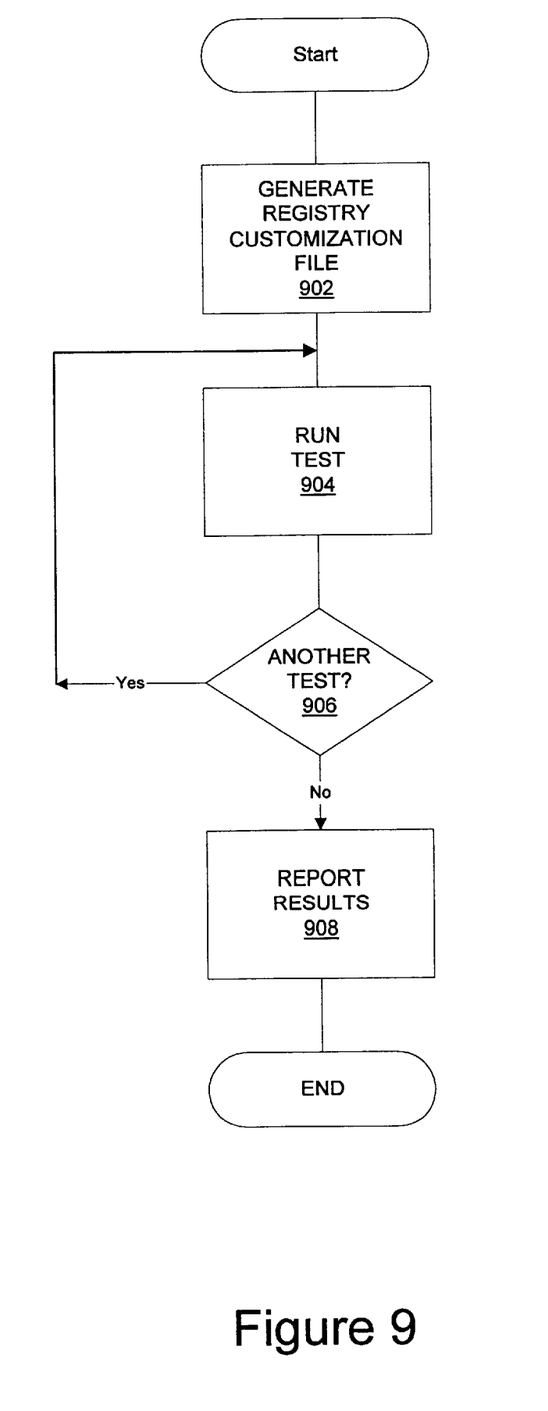
FIG. 9 shows a flow chart of a test function that may be performed using the AGP chipset driver of FIG. 3.

Referring to FIG. 9, a flow chart showing the testing of the AGP interface using the persistent data field configuration option of AGP chipset driver 170 is shown.

A plurality of different data field configurations are stored in the registry customization files. The data fields that are configurable include the chipset queue depth data field (qdepth), the data transfer speed/mode field (dspeed), the GART index mode field (GARTTranslationMode), the page table cache field (PTCache), and the master table cache field (MTCache). The queue depth field is used by the AGP chipset driver 170 to program the master to enqueue a maximum of this number of requests to the target (i.e., the chipset). The data transfer speed/mode field selects the data transfer rate to program both the target and the master. The GART index mode field selects the type of Graphics Address Remap Table for the AGP chipset driver 170 to create. The AGP chipset driver 170 also programs the chipset to operate using this type of translation (indirection level) for addresses within the AGP memory address aperture. The page table cache field is active when either 1 or 2 level page tables are used. This field turns caching on in the chipset for the Page Tables. The master table cache field is used when 2-level page table are used. This field turns caching on in the chipset for the master page table (also known as Page directory).

Table 1 sets forth the various fields which are configurable with AGP chipset driver 170 as well as values that the field may be configured to contain.

TABLE 1

| Field | Value |
|---|---|
| Chipset Queue Depth | 2,16,64 |
| Data Transfer Speed/Mode | 1,2 |
| GART Index Mode | 1,2 |
| PTCache | 1,0 |
| MTCache | 1,0 |

Figure 10A:
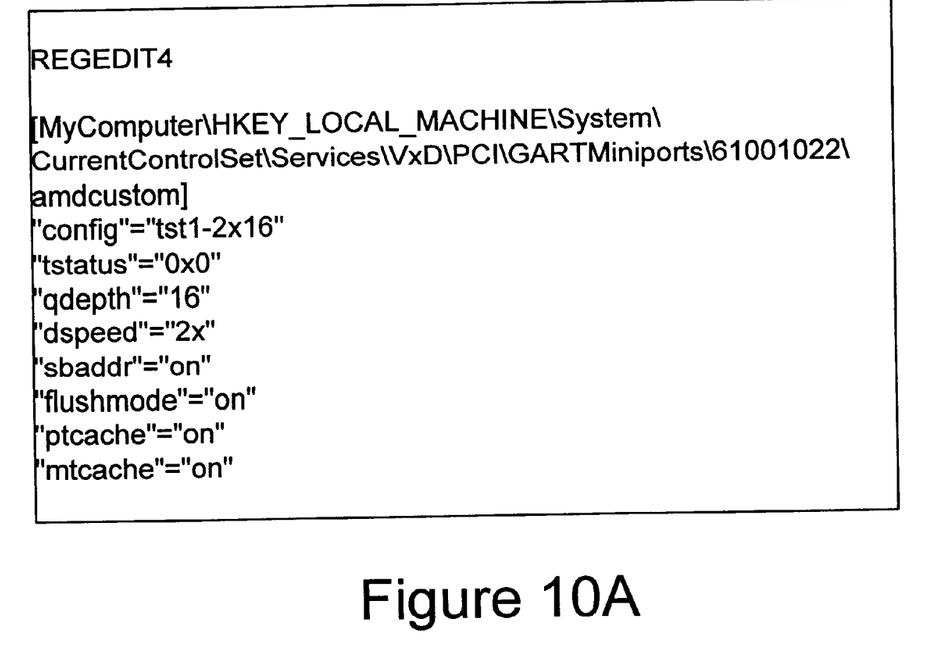
FIGS. 10A and 10B show exemplative registry customization files for use with the test function of FIG. 9.
Figure 10B:
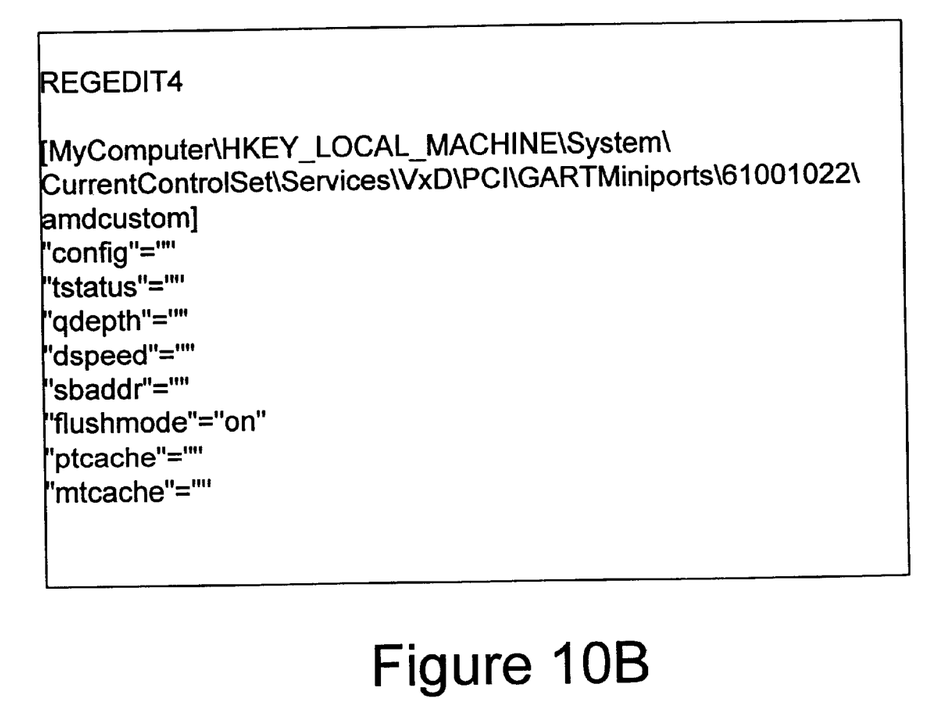

For example, FIGS. 10A and 10B show examples of registry entries which may be loaded into AGP chipset driver 170 to allow testing of the various parameters.

Other Embodiments

Other embodiments are within the following claims.

For example, while the system control circuit 120, super I/O circuit 130 and graphic controller 150 are described as including various functions and are coupled to various buses, it will be appreciated that the distinctions between the circuits are somewhat arbitrary and that the functions described within those circuits may be embodied within a number of different locations. Accordingly, the presence and location of any described functions are not intended to be limiting.

Also for example, while various bus architectures are described as coupling various components, it will be appreciated that any type of bus architecture. Accordingly, the described architectures are not intended to be limiting.

What is claimed is:

1. A method for reporting errors during the operation of a device driver operating on a graphics chipset comprising:

providing an operating system with a persistent data file;

determining whether an error has occurred during the operation of the device driver;

writing an error code to the persistent data file; and returning to operation of the device driver.

2. The method of claim 1 wherein:

the persistent data file is a registry file.

3. The method of claim 2 wherein:

the error code is one of a plurality of error codes stored in the persistent data file.

4. The method of claim 3 wherein:

the plurality of error codes are stored within a test status data field.

5. The method of claim 4 wherein:

the test status data field stores the four most recent error codes, the most recent error code writing over the least recent error code.

6. The method of claim 4 wherein:

the test status data field is 32-bits wide; and each error code includes an 8-bit byte.

7. A method for reporting errors during the operation of an Accelerated Graphics Port (AGP) device driver operating on an AGP chipset comprising:

providing an operating system with a persistent data file;

determining whether an error has occurred during the operation of the AGP chipset device driver;

writing an error code to the persistent data file; and returning to operation of the AGP chipset device driver.

8. The method of claim 7 wherein:

the persistent data file is a registry file.

9. The method of claim 8 wherein:

the error code is one of a plurality of error codes stored in the persistent data file.

10. The method of claim 9 wherein:

the plurality of error codes are stored within a test status data field.

11. The method of claim 10 wherein:

the test status data field stores the four most recent error codes, the most recent error code writing over the least recent error code.

12. The method of claim 10 wherein:

the test status data field is 32-bits wide; and each error code includes an 8-bit byte.

13. A apparatus for reporting errors during the operation of an Accelerated Graphics Port (AGP) chipset comprising:

an operating system with a persistent data file;

an AGP chipset device driver stored in memory, the AGP chipset device driver operating on the AGP chipset;

means for determining whether an error has occurred during the operation of the AGP chipset device driver;

means for writing an error code to the persistent data file; and means for returning to operation of the AGP chipset device driver.

14. The apparatus of claim 13 wherein:

the persistent data file is a registry file.

15. The apparatus of claim 14 wherein:

the error code is one of a plurality of error codes stored in the persistent data file.

16. The apparatus of claim 15 wherein:

the plurality of error codes are stored within a test status data field.

17. The apparatus of claim 16 wherein:

the test status data field stores the four most recent error codes, the most recent error code writing over the least recent error code.

18. The apparatus of claim 16 wherein:

the test status data field is 32-bits wide; and each error code includes an 8-bit byte.

* * * * *